United States Patent [19]

Bruening et al.

[11] Patent Number: 5,250,188

[45] Date of Patent: Oct. 5, 1993

[54] PROCESS OF REMOVING AND CONCENTRATING DESIRED MOLECULES FROM SOLUTIONS

[75] Inventors: Ronald L. Bruening; Reed M. Izatt; Bryon J. Tarbet; Jerald S. Bradshaw, all of Provo, Utah

[73] Assignee: Brigham Young University, Provo, Utah

[21] Appl. No.: 401,670

[22] Filed: Sep. 1, 1989

[51] Int. Cl.$^5$ ............................................. C02F 1/42
[52] U.S. Cl. ........................................ 210/672; 210/679; 210/684; 210/685
[58] Field of Search ............... 210/679, 684, 685, 686, 210/688, 672

[56] References Cited

U.S. PATENT DOCUMENTS

| | | | |
|---|---|---|---|
| 2,925,431 | 2/1960 | Choppin et al. | 210/672 |
| 2,954,276 | 9/1960 | Hazen | 210/684 |
| 2,962,351 | 11/1960 | Stevenson | 210/684 |
| 2,980,607 | 4/1961 | Mock et al. | 210/684 |
| 3,003,866 | 10/1961 | Mattano et al. | 210/672 |
| 3,118,831 | 1/1964 | Morris | 210/688 |
| 3,663,163 | 5/1972 | De Pree et al. | 210/672 |
| 3,749,668 | 7/1973 | Walker | 210/685 |
| 3,755,161 | 8/1973 | Yokota et al. | 210/679 |
| 4,569,765 | 2/1986 | Beale, Jr. | 210/688 |
| 4,576,928 | 3/1986 | Tani et al. | 502/401 |
| 4,637,994 | 1/1987 | Tani et al. | 502/401 |
| 4,659,512 | 4/1987 | Macedo et al. | 210/688 |
| 4,732,887 | 3/1988 | Obanawa et al. | 210/679 |
| 4,746,572 | 5/1988 | Glajch et al. | 210/656 |
| 4,861,490 | 8/1989 | Morris | 210/688 |
| 4,867,882 | 9/1989 | O'Neill et al. | 210/684 |
| 4,894,167 | 1/1990 | Holl et al. | 210/688 |
| 4,927,541 | 5/1990 | Matsuda et al. | 210/672 |
| 4,943,375 | 7/1990 | Bradshaw et al. | 210/688 |
| 4,946,596 | 8/1990 | Furuta et al. | 210/688 |
| 4,952,321 | 8/1990 | Bradshaw et al. | 210/688 |
| 4,959,153 | 9/1990 | Bradshaw et al. | 210/688 |
| 4,975,379 | 12/1990 | Bradshaw et al. | 210/688 |

Primary Examiner—Stanley S. Silverman
Assistant Examiner—Cynthia L. Nessler
Attorney, Agent, or Firm—Thorpe, North & Western

[57] ABSTRACT

A method is disclosed for the quantitative removal and concentration of desired molecules or ions, such as gases, anions and amino acids, from a source solution which may contain larger concentrations of other molecules. The method comprises bringing the source solution into contact with a solid cation-ligand-matrix consisting of a cation complexed to a ligand molecule covalently bonded to a matrix consisting of an organic spacer bonded to a solid inorganic support through a silicon atom. The cation has an affinity for the desired molecules to form a complex between the desired molecules and the cation portion of the solid cation-ligand-matrix at binding sites initially held by $H_2O$ or other weakly coordinated ligands or via ion pairing. The desired molecule complex is broken releasing either the desired molecules or desired molecules complexed with the cation by contacting the solid cation-ligand-matrix-desired molecule complex with a much smaller volume of a receiving solution in which said desired molecules are soluble. The concentrated ions or molecules thus removed may be analyzed and/or recovered by known methods. The process is useful in measuring the concentrations of molecules originally present at parts per billion levels; in the removal of low levels of toxic molecules such as ammonia or anions such as chromate from potable and saline water; in the preparation of ultrapure salts and gases; and in the recovery of valuable molecules present in low concentrations as in the separation of amino acids, etc.

29 Claims, No Drawings

PROCESS OF REMOVING AND CONCENTRATING DESIRED MOLECULES FROM SOLUTIONS

FIELD OF THE INVENTION

This invention relates to a process for removing and concentrating certain desired molecules, such as gases, amino acids, anions, and others, from solutions wherein such molecules may be admixed with other molecules which may be present in much higher concentrations. More particularly, this invention relates to a process for removing such molecules from an admixture with others in solution by forming a complex of the desired ions or molecules with a cation complexed to a ligand molecule covalently bonded to an inorganic matrix by flowing such solutions through a packed column packed with such cation-ligand-matrix and then breaking either the molecule-bound cation or cation-bound ligand complex by flowing a receiving liquid in much smaller volume than the volume of solution passed through the column to remove and concentrate the desired ions or molecules in solution in the receiving liquid. The concentrated ions or molecules thus removed may be analyzed and/or recovered by known methods. For the sake of convenience the term "desired molecules" is used throughout the specification to include both molecules and anions.

BACKGROUND OF THE INVENTION

Effective methods of recovery and/or separation of particular molecules such as gases, anions, amino acids, and others, from other molecules in water supplies, organic solvents, waste solutions, and industrial solutions and streams represent a real need in modern technology. These molecules are often present at low concentrations in solutions containing other molecules at much greater concentrations Likewise there is a need to concentrate these molecules so that an effective analysis using known methods can be carried out. Hence, there is a real need for a process to selectively recover and concentrate these molecules.

It is known that many cations present as solutes in a solvent such as water, existing either as the free cation or complexed by a ligand solute, are capable of additional complexation at binding sites initially held by $H_2O$ or other weakly coordinated ligands or via ion pairing. These cations or cation-ligand complexes are characterized by their ability to selectivity form strong bonds with other strongly bonding ligand(s) solutes when the $H_2O$ or other weakly coordinated ligands are released. See, for example, Smith et al., CRITICAL STABILITY CONSTANTS, 6 volumes, Plenum Press, New York, 1975, 1982, 1989., and Bard, et al., STANDARD POTENTIALS IN AQUEOUS SOLUTION, Marcel Dekker, New York, 1985. However, researchers have not previously been able to effectively incorporate these cation-ligand complexes, which are capable of further selective complexation, into separation systems where the behavior of the cation-ligand complex in the separation systems in comparison to that of the cation-ligand complex as a solute remains unchanged. Nor have researchers developed a system wherein the cation-ligand complex will remain in the separation system for use in repeated separations.

Many organic ligands have been attached to polymeric supports, such as polystyrene, but the properties of the support bound ligands are substantially different compared to the analogous unbound ligand as an aqueous solute. A review article on this subject is found in Volume 19 of the series "Critical Reports on Applied Chemistry", in Chapter 4 (pp.167–223) entitled CHELATING ION EXCHANGERS by A. Warshawsky, Edited by Streat et al., John Wiley and Sons, 1987. Attaching these organic ligands to hydrophobic supports substantially changes the properties of the ligand molecules.

Articles such as SILANE COMPOUNDS FOR SILYLATING SURFACES by E. P. Plueddemann, in "Silanes, Surfaces and Interfaces Symposium, Snowmass, 1985", Ed. by D. E. Leyden, Gordon and Breach Publishers, 1986, pp. 1–25 and SILANE COUPLING AGENTS by E. P. Plueddemann, Plenum Press, 1982, pp. 1–235 list many different types of organic materials which have been attached to silane compounds and discusses some of their properties. E. P. Plueddemann in METAL EXTRACTION FROM SOLUTION AND IMMOBILIZED CHELATING AGENTS USED FOR THIS PROCESS, Canadian Patent 1,196,618 issued Nov. 12, 1985 and others have reported in the patent literature other ligands which can be immobilized on silica gel and used to complex metal cations from aqueous solutions. However, the use of coordinating molecules covalently bound to solid materials to complex metal cations to the solid support and the subsequent use of additional coordination sites of the metal cation to perform specific separations with regard to gases, amino acids, anions, and other molecules has not been previously reported.

Researchers have had moderate success in using plain ion exchange beds to complex cations and then using the bound cations to effect separations. Articles such as DETERMINATION OF THE TWO-PHASE EQUILIBRIUM CONSTANTS OF COPPER Cu(II)-MODIFIED SILICA GELS USED IN LIQUID CHROMATOGRAPHY. by Guyon et al., Analytica Chimica Acta, 170 (1985) 311–317 describe such efforts with hydrophilic supports such as silica gel. Suzuki et al., in SEPARATION OF OLEFINIC COMPOUNDS, Japanese Kokai Patent number 75 05, 302 (Cl.16AO) published Jan. 21, 1985 report an example of the use of metals bonded to an ion exchange resin composed of hydrophobic supports such as polystyrene to effect separations. However, there has been no previous report of using bound coordination ligands covalently attached to a solid support, such as silica gel, and containing a complexed cation to effect separations. The use of the bound coordinating ligand rather than an ion exchange bed allows for both much greater stability and selectivity in maintaining the cation on the resin as well as a much greater variety of separations to be performed.

There is a particular need in modern society to (1) measure the concentrations of molecules in low parts per million (ppm) to low parts per billion (ppb) concentrations; (2) to remove low levels of toxic molecules from solutions such as potable and saline water; and (3) to recover valuable molecules which are present in solution at low concentrations. For example the allowable amount of ammonia in saline water in order for fish to live is approximately 1–2 parts per million. Present methods for analysis of these molecules at these levels are not accurate and/or are very time consuming. Furthermore, removal of the molecules is not selective, but is expensive and equipment intensive using present methods. Other present needs in industry which present utility opportunities for the use of solid supported ligand bound cations include removal of toxic anions such as $CrO_4^{2-}$, preparation of ultrapure salts (halide separations), preparation of ultrapure gases ($O_2$ and other separations), separation of amino acids and amines and others. Thus, development of means to utilize the molecule complexing properties of complexes of cations with ligands attached to an inorganic support, such as silica gel or titanized silica gel, would be of the utmost importance for the repeated separation and concentration of certain molecules for analysis, and/or recovery purposes. The process of the present invention accomplishes this feat.

SUMMARY OF THE INVENTION

The process of the present invention utilizes a cation-ligand-matrix consisting of suitable cations complexed to ligands which, in turn, are covalently bonded through a spacer grouping and a silicon atom to an inorganic support such as sand, silica gel, glass, glass fibers, alumina, nickel oxide, zirconia or titania. The cation-ligand-matrix is represented by Formula 1 as follows:

Matrix-L-M                    (Formula 1)

wherein M is a metal cation, L is a coordination ligand consisting of an organic molecule known to chelate metal cations, and Matrix is a member having the formula:

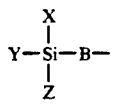

wherein B is a spacer grouping having from 1 to 10 carbon atoms and which is of a functional nature that it is sufficiently hydrophilic to function in an aqueous environment and will separate the ligand cation (-L-M) from the solid support surface to maximize the interaction between L-M and the desired molecules being separated; Si is silicon; and, X, Y and Z is each a member selected from the group consisting of Cl, Br, I, O-alkyl, alkyl, or O-solid hydrophilic inorganic support wherein the solid hydrophilic support is a member selected from the group consisting of silica, zirconia, titania, alumina, nickel oxide or any other similar hydrophilic inorganic support material, with the proviso that at least one of X, Y and Z must be O-solid hydrophilic inorganic support. Alkyl or O-alkyl means a 1-6 carbon member alkyl or alkoxy group which may be substituted or unsubstituted, straight or branched chain. By substituted is meant substituted by groups such as Cl, Br, I, $NO_2$ and the like. When X, Y and Z are other than O-solid hydrophilic support they are functionally classified as leaving groups, i.e. groups attached to the silicon atom which, when reacted with the O-solid hydrophilic support material, may leave or be replaced by the O-solid support. Hence, they are functional groups left over after reacting a silicon containing spacer group with the solid hydrophilic support and have no direct function in the interaction between the cation-ligand-matrix and the desired molecule. Typical silicon containing spacer groups for reacting with a solid support material to form the matrix of the formula:

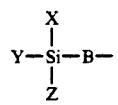

include, diethyl(triethoxysilylpropyl)malonate; 3-mercaptopropyltrimethoxysilane; 3-aminopropyltrimethoxysilane; N-[(3-trimethoxysilyl)propyl]ethylenediaminetriacetic acid; p-(chloromethyl)phenyltrimethoxysilane; vinyltriethoxysilane; 3-bromopropyltriethoxysilane; 3-glycidoxypropyltrimethoxysilane and the like.

The cation-ligand-matrix is characterized by high selectivity for and removal of desired molecules or groups of desired molecules such as gases, anions, amino acids and others present at low concentrations from the source solution containing a mixture of desired molecules with undesired molecules one does not wish to remove from the solution. The so-called undesired molecules may be present in much greater concentrations than the desired molecules to be removed. The separation is effected in a separation device such as a column through which the source solution is flowed. The process of selectively removing and concentrating the desired molecule(s) is characterized by the ability to selectively and quantitatively complex the desired molecules to the cation portion of the cation-ligand-matrix system, from a large volume of solution, even though the desired molecules may be present at low concentrations. The desired molecules are subsequently recovered from the separation column by flowing through it a small volume of a receiving phase which contains a solubilized reagent which need not be selective, but which will quantitatively strip the molecules from the cation-ligand-matrix. The analysis of the desired metal ions in the concentrated solution is accomplished by known methods such as atomic absorption spectroscopy. The recovery of the desired metal ions from the receiving phase is easily accomplished by well known procedures. The invention also includes a process for the complexing of the cations to the bound ligand-matrix by either flowing solutions containing the cation and any other needed reagents through a column containing the bound ligand-matrix or mixing the cation-containing solution and the bound ligand-matrix material in a mixing vessel. The process for producing the bound ligand-matrix will be mentioned but is not a part of the present invention since such processes are disclosed and claimed in copending application Ser. No. 07/218,156 filed Jul. 13, 1988 by Bradshaw et al., entitled "Sulfur-Containing Hydrocarbons A As Intermediates Covalently Bonded To Trialkoxysilane and B Such Intermediates Further Covalently Bonded To Silica, And The Process Of Removing And Concentrating Desired Ions From Solutions Thereof With Other Ions By Forming A Complex Thereof With A B Compound, Breaking The Complex With A Receiving Liquid And Recovering The Ions Therefrom" which application is incorporated herein by reference.

DETAILED DESCRIPTION OF THE INVENTION

As summarized above, the present invention is drawn to the removal and concentration of certain desired molecules, such as gases, amino acids, anions, and others, from source solutions where the desired molecules may be admixed with other molecules which may be present in much higher concentrations. This is accomplished by forming a complex of the desired molecules with a cation-ligand-matrix shown in Formula 1, by flowing such source solutions through a packed column packed with a cation-ligand-matrix to attract and bind the desired molecules to the cation portion of such matrix and subsequently breaking either the molecule-bound cation or cation-bound ligand complex by flowing a receiving liquid in much smaller volume than the volume of source solution passed through the column to remove and concentrate the desired ions in the receiving liquid solution. The desired molecules thus quantitatively stripped from the cation-ligand-matrix in concentrated form in the receiving solution may then be analyzed and/or the concentrated desired molecules may be recovered. The analysis and recovery from the receiving liquid are accomplished by known methods. The preparation of the cation-ligand-matrix is accomplished by either flowing solutions containing the cation and any other needed reagents through a column containing the matrix bound ligand molecule or mixing the cation-containing solution and the matrix bound ligand material in a mixing vessel.

In Formula 1 the coordinating ligand, L, can be any ligand which has been found to complex the cation to be used without using all of the coordination sites available to that cation in the formation of complexes or which allows for ion pairing interactions of the cation to be maintained. Publications detailing such cation-molecule complexation either with the cation not being complexed by another ligand or with the cation complexed by a ligand not bound to a solid support include Smith et al, CRITICAL STABILITY CONSTANTS, 6 vols., Plenum Press, New York, 1975, 1982, 1989 and Bard et al., STANDARD POTENTIALS IN AQUEOUS SOLUTION, New York, 1985. Illustrations of typical ligand-cation combinations are given in the examples which are contained below.

The ligands which can be most effectively used are generally members selected from the group consisting of amines, pyridines, amino acids, thiols, phenantrolines, hydroxamic acids, oximes, amides, thioethers, and combinations thereof.

The cations most effectively used are members selected from the group consisting of $Co^{3+}$, $Cr^{3+}$, $Hg^{2+}$, $Pd^{2+}$, $Pt^{2+}$, $Pd^{4+}$, $Pt^{4+}$, $Rh^{3+}$, $Ir^{3+}$, $Ru^{3+}$, $Co^{2+}$, $Ni^{2+}$, $Cu^{2+}$, $Zn^{2+}$, $Cd^{2+}$, $Pb^{2+}$, $Mn^{2+}$, $Fe^{3+}$, $Fe^{2+}$, $Au^{3+}$, $Au^{+}$, $Ag^{+}$, $Cu^{+}$, $MO_2^{2+}$, $Tl^{3+}$, $Tl^{+}$, $Bi^{3+}$, $CH_3Hg^{+}$, $Al^{3+}$, $Ga^{3+}$, $Ce^{3+}$, $UO_2^{2+}$ and $La^{3+}$ and combinations thereof.

However, the above ligands and cations are only exemplary and any other ligands and cations which will function to attach to a matrix and bind the desired molecules are considered to be within the scope of the invention.

The process of selectively and quantitatively removing and concentrating a desired molecule or group of desired molecules present at low concentrations from a plurality of other undesired molecules in a multiple molecule source solution in which the undesired molecules may be present at much higher concentrations comprises bringing the multiple molecule source solution into contact with a cation-ligand-matrix shown in Formula 1 which causes the desired molecule(s) to complex with said cation-ligand matrix and subsequently breaking either the cation-molecule or cation-bound complex with a receiving solution which takes the desired molecule(s) into solution in a concentrated form from which they can be analyzed and/or recovered by known means.

The cation may be attached to the ligand-matrix by either flowing solutions containing the cation and other needed reagents such as oxidation-reduction reagent(s) and/or complexing agents needed for solubility of the metal through a column containing the ligand molecule bound to the matrix or mixing the cation-containing solution and the ligand-matrix in a mixing vessel.

The cation-ligand-matrix functions to attract the desired molecules according to Formula 2:

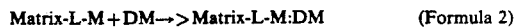

Matrix-L-M + DM —→ Matrix-L-M:DM   (Formula 2)

wherein L and M stand for ligand and cation as above defined and wherein DM stands for the desired molecule being removed.

Once the desired molecules are bound to the cation, they are subsequently separated by use of a smaller volume of a receiving liquid according to one of Formula 3 or Formula 4:

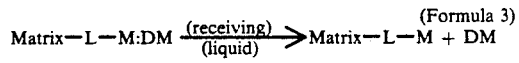

$$\text{Matrix}-L-M{:}DM \xrightarrow[\text{(liquid)}]{\text{(receiving)}} \text{Matrix}-L-M + DM \quad \text{(Formula 3)}$$

or

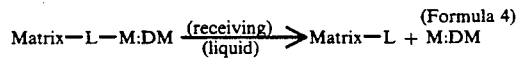

$$\text{Matrix}-L-M{:}DM \xrightarrow[\text{(liquid)}]{\text{(receiving)}} \text{Matrix}-L + M{:}DM \quad \text{(Formula 4)}$$

The preferred embodiment disclosed herein involves carrying out the process by bringing a large volume of the source multiple molecule solution into contact with a cation-ligand-matrix of Formula 1 in a separation column through which the mixture is first flowed to complex the desired molecule or molecules (DM) with the cation-ligand-matrix as indicated by Formula 2 above, followed by the flow through the column of a smaller volume of a receiving liquid, such as dilute aqueous hydrochloric or nitric acid, to break the complex by chemical or thermal means, dissolve the desired molecules and carry them out of the column in a concentrated form. The degree or amount of concentration will obviously depend upon the concentration of desired molecules in the source solution and the volume of source solution to be treated. The specific receiving liquid being utilized will also be a factor. Generally speaking the concentration of desired molecules in the receiving liquid will be from 50 to 1,000,000 times greater than in the source solution. Other equivalent apparatus may be used instead of a column, e.g., a slurry which is filtered, washed with a receiving liquid to break the complex and recover the desire molecules(s). The desired molecules are then analyzed by known methods, and/or recovered from the receiving phase by known procedures.

More particularly, the process of the invention comprises placing the cation-ligand-matrix of Formula 1 in a contacting device such as a tall column, causing a large volume of the source solution containing a mixture of desired and undesired molecules to flow through the column where the desired molecules complex with the cation-ligand-matrix which still contains available coordination sites with respect to the cation, which separates the desired molecules from the rest of the source solution mixture which flows out of the column, then flowing a small volume of the receiving liquid through the column to break the complex and dissolve and carry out of the column the desired molecule(s) in concentrated form. The desired molecules are then analyzed by known methods such as atomic absorption spectroscopy, and/or recovered from the receiving liquid by known procedures.

Illustrative of classes of desired molecules which have strong affinities for ligand bound cations with ion pairing ability or additional coordination sites are solvated gases, amino acids, anions, amines and neutral liquids and solutes other than gases. There follows a listing of each of these categories naming specific desired molecules (or anions) within each grouping and the cations, which may be bound to a ligand, to which the desired molecules have a strong affinity.

| Desired Molecule | Cations |
|---|---|
| Solvated Gases: | |
| $O_2$ | $Fe^{2+}$ and $Co^{2+}$ |
| $NH_3$ | $Cu^{2+}, Ni^{2+}, Pd^{2+}, Hg^{2+}, Co^{3+}$ |
| $SO_2$ | $Ag^+, Cu^+, Cd^{2+}, Hg^{2+}$ |
| $SO_3$ | $Fe^{3+}, Pb^{2+}$ |
| NO | $Fe^{2+}$ |
| $N_2$ | $Pd^{2+}, Pt^{2+}, Pt^{4+}, Fe^{2+}, MO^{2+}$ |
| CO | $Fe^{2+}, Cu^{2+}, Ni^{2+}, Pd^{2+}, Zn^{2+}, Cd^{2+}, Hg^{2+}$ |
| $CO_2$ | $Zn^{2+}$ |
| Ethene | $Cu^{2+}, Ni^{2+}, Fe^{2+}, Ag^+, Zn^{2+}$ |
| Propene | $Cu^{2+}, Ni^{2+}, Fe^{2+}, Ag^+, Zn^{2+}$ |
| Amino Acids: | |
| Glycine | $Ni^{2+}, Cu^{2+}, Fe^{3+}, Pd^{2+}, Hg^{2+}$ |
| Alanine | $Ni^{2+}, Cu^{2+}, Fe^{3+}, Pd^{2+}, Hg^{2+}$ |
| Valine | $Ni^{2+}, Cu^{2+}, Fe^{3+}, Pd^{2+}, Hg^{2+}$ |
| Leucine | $Ni^{2+}, Cu^{2+}, Fe^{3+}, Pd^{2+}, Hg^{2+}$ |
| Isoleucine | $Ni^{2+}, Cu^{2+}, Fe^{3+}, Pd^{2+}, Hg^{2+}$ |
| Proline | $Ni^{2+}, Cu^{2+}, Fe^{3+}, Pd^{2+}, Hg^{2+}$ |
| Phenylalanine | $Ni^{2+}, Cu^{2+}, Fe^{3+}, Pb^{2+}, Hg^{2+}, Zn^{2+}$ |
| Aspartic Acid | $Ni^{2+}, Cu^{2+}, Fe^{3+}, Pd^{2+}, Hg^{2+}, Zn^{2+}, Co^{2+}$ |
| Glutamic Acid | $Ni^{2+}, Cu^{2+}, Fe^{3+}, Pd^{2+}, Hg^{2+}, Zn^{2+}, Co^{2+}$ |
| Tyrosine | $Ni^{2+}, Cu^{2+}, Fe^{3+}, Pd^{2+}, Hg^{2+}, Zn^{2+}, Co^{2+}, Pb^{2+}$ |
| Serine | $Ni^{2+}, Cu^{2+}, Fe^{3+}, Pd^{2+}, Hg^{2+}, Zn^{2+}, Co^{2+}, Pb^{2+}$ |
| Glutamine | $Ni^{2+}, Cu^{2+}, Co^{2+}, Pd^{2+}, Hg^{2+}, Zn^{2+}$ |
| Arginine | $Ni^{2+}, Cu^{2+}, Co^{2+}, Pd^{2+}, Hg^{2+}, Zn^{2+}$ |
| Cysteine | $Ni^{2+}, Cu^+, Pb^{2+}, Pd^{2+}, Hg^{2+}, Zn^{2+}$ |
| Methionine | $Ni^{2+}, Cu^{2+}, Pb^{2+}, Pd^{2+}, Hg^{2+}, Zn^{2+}, Fe^{3+}$ |
| Histidine | $Ni^{2+}, Cu^{2+}, Co^{2+}, Pd^{2+}, Fe^{2+}, Zn^{2+}, Cd^{2+}$ |
| Nitrilotriacetic acid | $Ni^{2+}, Cu^{2+}, Fe^{3+}$ |
| Anions: | |
| $Cl^-$ | $Pd^{2+}, Ag^+, Hg^{2+}, Cu^+, Tl^{3+}$ |
| $Br^-$ | $Pd^{2+}, Ag^+, Hg^{2+}, Cu^+, Tl^{3+}, Bi^{3+}, CH_3Hg^+$ |
| $I^-$ | $Pd^{2+}, Ag^+, Hg^{2+}, Cu^+, Tl^{3+}, Bi^{3+}, CH_3Hg^+, Cd^{2+}$ |
| $SO^{2-}$ | $Fe^{3+}, Pb^{2+}$ |
| $SO_3^{2-}$ | $Cd^{2+}, Hg^{2+}, Ag^+, Cu^+, Ce^{3+}, CH_3Hg^+$ |
| $CrO_4^{2-}$ | $Hg^{2+}, Cu^{2+}, Tl^+, Ag^+$ |
| $SCN^-$ | $Hg^{2+}, Pd^{2+}, Au^+, Ag^+$ |
| $SeCN^-$ | $Hg^{2+}$ |
| $NO_2^-$ | $Pd^{2+}$ |
| $PO_4^{2-}$ | $Al^{3+}, Pb^{2+}, Ga^{3+}, Cu^2, Ni^{2+}$ |
| $S_2O_3^-$ | $Au^{3+}$ |
| $HS^-$ | $Ag^+, Hg^{2+}, Cd^{2+}$ |
| $S^{2-}$ | $CH_3Hg^+$ |
| Acetate | $UO_2^{2+}, Fe^{3+}, Hg^{2+}, Tl^{3+}$ |
| Citrate | $La^{3+}, Pb^{2+}$ |
| Amines, Neutral Liquids and Solutes Other Than Gases: | |
| Pyridine | $Cu^{2+}, Ni^{2+}, Pd^{2+}, Zn^{2+}$ |
| Cyclopentadiene | $Cu^{2+}, Ni^{2+}, Fe^{2+}, Zn^{2+}, Ag^+$ |
| Ethylene diamine | $Cu^{2+}, Ni^{2+}, Pd^{2+}, Zn^{2+}$ |
| Methyl amine | $Cu^{2+}, Ni^{2+}, Pd^{2+}, Zn^{2+}$ |
| Phenanthroline | $Cu^{2+}, Ni^{2+}, Pd^{2+}, Zn^{2+}$ | the above listing of desired molecules and associated preferred cations is not comprehensive and is intended only to show (1) the types of preferred molecules which may be bound to ligand attached cations and (2) to further illustrate typical cations which can be ligand bound and still attract and bind the desired molecules in the manner described above.

DESCRIPTION OF THE PREFERRED EMBODIMENT OF THE INVENTION

Preparation of Ligand-Matrix Compounds

Ligands capable of complexing cations without using all of the coordination sites of the cations must be covalently bonded to the inorganic support matrix. Although the formation of ligand-matrix combinations is taught in the art, in order to illustrate a complete embodiment of the invention, methods which illustrate preparation of ligand-matrix compounds are included.

EXAMPLE 1

In this example 3-glycidoxypropyltrimethoxysilane (236 g, 1 mole) in 7 liters of toluene was added to 60 g (1 mole) of the ligand ethylenediamine. The mixture was stirred at room temperature for 24 hours before 2.5 Kg of 60–200 mesh silica gel, as the solid support material, was added to the stirred solution. The temperature was then increased to 55–88 C. and heated for an additional 24 hours. The final product was collected by filtration and dried yielding a matrix-ligand complex. The matrix is formed by the reaction of the trimethoxysilane end of the 3-glycidoxypropyltrimethoxysilane spacer group with the silica gel support and the ethylenediamine ligand is covalently bonded to the 3-glycidoxypropyl end of the spacer group.

EXAMPLE 2

In this example 94 g (1 mole) of the coordinating ligand ethanedithiol and sodium methoxide (catalytic amount) were added to 7 liters of toluene containing 472 g (2 mole) of 3-glycidoxypropyltrimethoxysilane as the spacer. The reaction was warmed to 50–70 C. for 24 hours, 2.5 Kg of 60–200 mesh silica gel was added and the solution stirred for an additional 24 hours. The product was collected by filtration and dried before use. The matrix is essentially the same as that formed in Example 1 with the ethylene dithioether, ethanedithiol, attached as the ligand to the 3-glycidoxypropyl end of the spacer group.

EXAMPLE 3

This example is the same as Example 1 except that 150 g of triethylene tetraamine was used in place of the ethylenediamine as the ligand.

EXAMPLE 4

In this example the amino acid L-tyrosine was used as the ligand and attached to silica gel through a spacer grouping by the following procedure. In a three-necked 500 ml round bottom flask equipped with a mechanical stirrer, 2.5 g (13.8 mmol) of L-tyrosine was combined with 27.6 mmol of sodium methoxide in methanol. After the tyrosine had dissolved, 3.42 g (13.8 mmol) of 3-glycidoxypropyltrimethoxysilane was added as a spacer and the mixture allowed to react overnight. After stirring overnight, 34.5 g of 60–200 mesh silica gel was added along with 250 ml of toluene and the mixture was heated to near reflux overnight again. The product was collected by filtration and washed, followed by air-drying.

Preparation of Cation-Ligand-Matrix Compounds

The ligand bound to the matrix must now be made to complex a cation with desired affinity for other molecule(s). A listing of preferred cations has been given previously. In some cases this can be done simply by either mixing the bound ligand-matrix material with a solution of just the cation or passing this solution through a column containing the bound ligand-matrix material. However, in some cases other reagents such as oxidation-reduction reagents and/or complexing agents to maintain cation solubility must be added to the cation-containing solution. Oxidation-reduction agents are required when a particular oxidation state of a cation is not stable until a complex with the bound ligand is formed. Gaseous oxygen and hydrogen peroxide are typical reagents that are used. In some cases, solubilized complexing agents must be used to solubilize cations. These complexing agents must form sufficiently strong complexes with the cation for solubilization to occur, but not form such a strong complex that bound ligand-cation complexation is hindered. Typical of common reagents used as complexing agents are ethylenediamine tetraacetic acid (EDTA), ammonia, excess chloride ions, and the like.

The preparation of cation-ligand-matrix compounds are illustrated in the following examples.

EXAMPLE 5

In this example $Pd^{2+}$ is the complexing cation which is reacted with the ligand-matrix of Example 2. A solution of 0.001 M $Pd(NO_3)_2$ in 1M $HNO_3$ was passed through a column containing the solid ligand-matrix material ethanedithia (thioether) attached to silica gel through a spacer as described in Example 2. The solid material turned from a white to a light orange color and analysis (atomic absorption spectroscopy) of the Pd-containing solution after separation from the solid indicated that enough Pd had been removed to be equivalent to loading 0.34 mmoles Pd/g solid material. This matched within analytical error the amount of ethanedithia ligand bound to the silica gel. Alternately, instead of using a column, the solution and the solid ligand-matrix material could have been mixed in a beaker.

EXAMPLE 6

In this example $Co^{3+}$ is the complexing cation which is reacted with the ligand-matrix of Example 3. An aqueous solution of 0.01M $CoCl_2$ containing 1-2% $H_2O_2$ was passed through a column containing (or mixed in a beaker) with the solid ligand-matrix material made of tetraamine attached to silica gel through a spacer as described in Example 3. The solid material turned from an initial white color to a brown color and then to a purple color. These colors are indicative of the initial binding of $Co^{2+}$ to a bound amine-containing ligand followed by oxidation of the $Co^{2+}$ to $Co^{3+}$. An analysis of the solution after separation from the solid by atomic absorption spectroscopy showed that the amount of the Co removed from the solution was equivalent to 0.40 mmoles Co/g solid material. This also matched within analytical error the amount of bound ligand on the solid material.

EXAMPLE 7

The procedure of Example 6 was repeated using the ethylenediamine ligand of Example 1 rather than the tetraamine bound to silica gel through a spacer. Similar results were obtained with the exception that the final color of the material was reddish brown and the bound ligand and bound cobalt capacities were found to be 0.33 mmoles/g.

EXAMPLE 8

In this example $Cu^{2+}$ is the complexing cation which is reacted with the ligand-matrix of Example 4. The solid material containing L-tyrosine ligand covalently bonded, through a spacer, to silica gel as shown in Example 4 was placed in a column and a solution of 0.001M $CuCl_2$ in 0.1M $MgCl_2$ was passed through the column. The solid material turned from a white to a dark blue color and analysis (atomic absorption spectroscopy) of the Cu-containing solution after separation from the solid indicated that enough Cu had been removed to be equivalent to loading 0.18 mmoles Cu/g solid material. This matched within analytical error the amount of tyrosine ligand bound to the spacer-silica gel matrix.

EXAMPLE 9

In this example $Hg^{2+}$ is the complexing cation which is reacted with the ligand-matrix of Example 4. The solid material containing L-tyrosine covalently bonded, through a spacer, to silica gel as shown in Example 4 was placed in a column and a solution of 0.001M $Hg(NO_3)_2$ in 0.1M $Mg(NO_3)_2$ was passed through the column. Analysis (atomic absorption spectroscopy) of the Hg-containing solution after separation from the solid indicated that enough Hg had been removed to be equivalent to loading 0.18 mmoles Hg/g solid material. This matched within analytical error the amount of tyrosine ligand bound to the silica gel.

Removal of Desired Molecules With Cation-Ligand-Matrix Compounds

The following Examples demonstrate how the cation-ligand-matrix compounds may be used to concentrate and/or remove desired ions. The cation-complexing bound ligand containing inorganic matrix material of Formula 1 is placed in a column. An aqueous solution containing the desired molecule or molecules, in a mixture of other molecules which may be in a much greater concentration, is passed through the column. The flow rate for the solution may be increased by applying pressure with a pump on the top of the column or applying a vacuum in the receiving vessel. After the solution has passed through the column, a much smaller volume of a recovery solution i.e. an aqueous acid solution, which will protonate some complexed molecules like ammonia thereby releasing the ammonia from being complexed to the metal, is passed through the column. This receiving solution contains only the desired molecule in a concentrate form for subsequent analysis and/or recovery. Suitable receiving solutions can be pH reagents, i.e acids or bases, or complexing agents that either complexes the desired molecule away from the bound cation-ligand-matrix material as shown in Formula 3 or which complexes the metal cation and desired molecules away from the solid supported ligand as shown in Formula 4. Typical examples of suitable receiving solutions are acids such as hydrochloric, nitric, sulfuric, phosphoric and acetic acids; bases maintained at a pH less 11 such as ammonium hydroxide, sodium hydroxide; EDTA, and NTA, thiourea, certain amino acids such as glycine, other complexing agents such pyridine, etc.

The following examples of separations and recoveries of molecules by the inorganic support-bound ligands containing complexed metals which were made as described in Examples 10 through 14 are given as illustrations. These examples are illustrative only, and are not comprehensive of the many separations of molecules that are possible using the materials of Formula 1.

EXAMPLE 10

In this example, 2 grams of the $Co^{3+}$ cation complexed to the tetraamine ligand which in turn is bound to a spacer-silica gel matrix as shown in Example 6 was placed in a column 1.9 cm in diameter and 2.3 cm in length. A 500 ml solution of about 10 ppm of $NH_3$ in 0.1M aqueous $MgCl_2$ was passed through the column using a vacuum pump at 100 torr to increase the flow rate. A 10 ml aqueous solution of 1M HCl was passed through the column as the receiving liquid. An analysis of the recovery solution by colorimetry showed that greater than 99% of the $NH_3$ molecules originally in the 500 ml solution was present in the 10 ml recovery solution as $NH_4^+$ ions.

EXAMPLE 11

The procedure of Example 10 was repeated with the exception that 2 grams of the $Co^{3+}$ cation complexed to ethylenediamine ligand-containing which in turn is bound to a spacer-silica gel matrix as shown in Example 7 was used. Again, greater than 99% of the $NH_3$ in the original solution was found in the recovery solution.

EXAMPLE 12

In this example, 2 grams of the $Pd^{2+}$ cation complexed to the ethanedithia ligand which in turn is bound to a spacer-silica gel matrix as shown in Example 5 was placed in a column as described in Example 10. A 500 ml solution of about 0.001M $I^-$ and 0.001M $Cl^-$ was passed through the column using a vacuum pump at 100 torr to increase the flowrate. After washing the column with 50 ml of $H_2O$, a 10 ml aqueous receiving solution of 2M $NH_4OH$, 1M $HNO_3$ was passed through the column to remove both the $Pd^{2+}$ and the $I^-$. An analysis of the recovery solution by colorimetry showed that greater than 97% of the I molecules originally in the 500 ml solution and a similar percentage of the $Pd^{2+}$ bound to the column were recovered in the 10 ml recovery solution. The remaining $Pd^{2+}$ and $I^-$ were recovered within analytical standard deviation by flowing 10 ml of 1M NaCN through the column. No $Cl^-$ could be detected in either of the two recovery solutions. The $Pd^{2+}$ was analyzed using atomic absorption spectroscopy.

EXAMPLE 13

The procedure of Example 11 was repeated with $Br^-$ used instead of $I^-$. Again, within experimental error, a quantitative separation of $Cl^-$ and $Br^-$ was obtained.

EXAMPLE 14

In this example, 2 grams of the $Hg^{2+}$ cation complexed to the L-tyrosine ligand which in turn is bound to a spacer-silica gel matrix as shown in Example 9 was placed in a column as described in Example 10. A 500 ml solution of 0.001M racemic methionine and 0.001M racemic glycine was passed through the column using a vacuum pump at 100 torr to increase the flowrate. After washing the column with 50 ml of $H_2O$, a 10 ml aqueous receiving solution of 3M HCl was passed through the column to remove both the $Hg^{2+}$ and the amino acids. Chromatographic analysis of both the loading and recovery solutions indicated that the amino acid purity of the glycine in the recovery solution was greater than 99%, within detection, and that all of the glycine bound was recovered while all of the methionine passed through the column during the loading stage without being bound.

From the foregoing, it will be appreciated that the inorganic matrix-bound ligand-containing hydrocarbons with complexed metal cations containing additional coordination sites or ion pairing ability of Formula 1 of the present invention provide a material useful for the separation and concentration of the gases, anions, amino acids, and other molecules from mixtures of those molecules with molecules. The desired molecules can then be analyzed and/or recovered from the concentrated recovery solution by standard techniques known in the science of these materials.

Although the process of separating and concentrating certain molecules in this invention has been described and illustrated by reference to certain specific silica gel-bound ligand-containing complexed cations of Formula 1, processes using all analogs of these bound ligand-containing complexed metal cations with additional coordinating sites are within the scope of the processes of the invention as defined in the following claims.

We claim:

1. A method for the removal and concentration of desired molecules from a source solution which comprises bringing said source solution having a first volume into contact with a solid cation-ligand-matrix consisting of a cation complexed to a ligand molecule covalently bonded to a matrix consisting of an organic spacer bonded to a solid inorganic support through a silicon atom said cation having an affinity for the desired molecules to form a complex between said desired molecules and said cation portion of said solid cation-ligand-matrix;

removing said source solution from contact with said cation-ligand-matrix complexed with desired molecules; and contacting said solid cation-ligand-matrix complexed with said desired molecules with a smaller volume of a receiving solution in which said desired molecules are soluble thereby breaking said complex and recovering the desired molecules in concentrated form in said smaller volume of said receiving solution.

2. A method according to claim 1 wherein said solid cation-ligand-matrix is contained in a packed column and wherein said source solution is first flowed through said column wherein said desired molecules are removed from said source solution by the formation of a complex between said desired molecules and said cation portion of said solid cation-ligand-matrix followed by the breaking of said complex and removal of said desired molecules from said packed column by flowing said smaller volume of said receiving solution through said packed column and recovering said receiving solution containing said desired molecules in concentrated form.

3. A method according to claim 2 wherein the solid cation-ligand-matrix has the formula:

Matrix-L-M wherein M is a metal cation, L is a coordination ligand consisting of an organic molecule known to chelate metal cations, and Matrix is a member having the formula:

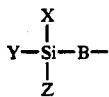

wherein B is a hydrophilic spacer grouping having from 1 to 10 carbon atoms; Si is silicon; and, X, Y and Z is each a member selected from the group consisting of Cl, Br, I, $C_1$ to $C_6$ alkoxy, $C_1$ to $C_6$ substituted alkoxy, $C_1$ to $C_6$ alkyl, $C_1$ to $C_6$ substituted alkyl and O-solid hydrophilic inorganic support and with at least one of X, Y and Z being O-solid hydrophilic inorganic support.

4. A method according to claim 3 wherein the O-solid hydrophilic support is a member selected from the group consisting of silica, zirconia, titania, alumina, nickel oxide or any other similar hydrophilic inorganic support materials.

5. A method according to claim 4 wherein the desired molecules are members selected from the group consisting of solvated gases, anions, amino acids, amines and neutral liquids and solutes other than gases.

6. A method according to claim 5 wherein M is a cation selected from the group consisting of $Co^{3+}$, $Cr^{3+}$, $Hg^{2+}$, $Pd^{2+}$, $Pt^{2+}$, $Pd^{4+}$, $Pt^{4+}$, $Rh^{3+}$, $Ir^{3+}$, $Ru^{3+}$, $Co^{2+}$, $Ni^{2+}$, $Cu^{2+}$, $Zn^{2+}$, $Cd^{2+}$, $Pb^{2+}$, $Mn^{2+}$, $Fe^{3+}$, $Fe^{2+}$, $Au^{3+}$, $Au^{3+}$, $Ag^+$, $Cu^+$, $MO_2^{2+}$, $Tl^{3+}$, $Tl^+$, $Bi^{3+}$, $CH_3Hg^+$, $Al^{3+}$, $Ga^{3+}$, $Ce^{3+}$, $UO_2^{2+}$ and $La^{3+}$ and combinations thereof.

7. A method according to claim 4 wherein L is a ligand selected from the group consisting of amines, pyridines, amino acids, thiols, phenantrolines, hydroxamic acids, oximes, amides, thioethers, and combinations thereof.

8. A method according to claim 4 wherein Matrix is a reaction product of O-solid hydrophilic support material with a silicon containing spacer grouping selected from the group consisting of diethyl(triethoxysilylpropyl)malonate; 3-mercaptopropyltrimethoxysilane; 3-aminopropyltrimethoxysilane; N-[(3-trimethoxysilyl)propyl]ethylenediaminetriacetic acid; p-(chloromethyl)phenyltrimethoxysilane; vinyltriethoxysilane; 3-bromopropyltriethoxysilane; 3-glycidoxypropyltrimethoxysilane; and combinations thereof.

9. A method according to claim 6 wherein the desired molecules are solvated gases.

10. A method according to claim 9 wherein the gases are members selected from the group consisting of oxygen, ammonia, sulfur dioxide, sulfur trioxide, nitrous oxide, nitrogen, carbon monoxide, carbon dioxide, ethene and propene.

11. A method according to claim 10 wherein M is a cation selected from the group consisting of $Fe^{2+}$, $Co^{2+}$, $Cu^{2+}$, $Ni^{2+}$, $Pd^{2+}$, $Hg^{2+}$, $Co^{3+}$, $Ag^+$, $Cu^+$, $Cd^{2+}$, $Fe^{3+}$, $Pb^{2+}$, $Fe^{2+}$, $Pt^{2+}$, $Pt^{4+}$, $MO_2^{2+}$ or $Zn^{2+}$ and mixtures thereof.

12. A method according to claim 11 wherein the solvated gas is ammonia and wherein M is a cation selected from the group consisting of $Cu^{2+}$, $Ni^{2+}$, $Pd^{2+}$, $Hg^{2+}$ and $Co^{3+}$ and mixtures thereof.

13. A method according to claim 11 wherein L is a thiol.

14. A method according to claim 13 wherein L is ethanedithia and wherein M is $Pd^{2+}$.

15. A method according to claim 11 wherein L is an amine.

16. A method according to claim 15 wherein L is triethylenetetraamine and M is $Co^{3+}$.

17. A method according to claim 15 wherein L is ethylenediamine and M is $Co^{3+}$.

18. A method according to claim 6 wherein the desired molecules are anions.

19. A method according to claim 18 wherein the anions are selected from the group consisting of $Cl^-$, $I^-$, $SO_4^{2-}$, $SO_3^{2-}$, $CrO_4^{2-}$, $SCN^-$, $SeCN^-$, $NO_2^-$, $PO_4^{3-}$, $S_2O_3^{2-}$, $Hs^-$, $S^{2-}$, acetate and citrate ions.

20. A method according to claim 19 wherein M is a cation selected from the group consisting of $Pd^{2+}$, $Ag^+$, $Hg^{2+}$, $Cu^+$, $Tl^{3+}$, $Bi^{3+}$, $CH_3Hg^+$, $Cd^{2+}$, $Fe^{3+}$, $Pb^{2+}$, $Tl^+$, $Cu^{2+}$, $Au^+$, $Al^{3+}$, $Ga^{3+}$, $Ni^{2+}$, $Au^{3+}$, $Ce^{3+}$, $UO_2^{2+}$ or $La^{3+}$ and mixtures thereof.

21. A method according to claim 20 wherein the anion is the iodide ion and wherein M is a cation selected from the group consisting of $Pd^{2+}$, $Ag^+$, $Hg^{2+}$, $Cu^+$, $Tl^{3+}$, $Bi^{3+}$, $CH_3Hg^+$ and $Cd^{2+}$ and mixtures thereof.

22. A method according to claim 21 wherein L is a thiol.

23. A method according to claim 22 wherein L is ethanedithia and M is $Pd^{2+}$.

24. A method according to claim 6 wherein the desired molecules are amino acids.

25. A method according to claim 24 wherein the amino acids are selected from the group consisting of glycine, alanine, valine, leucine, isoleucine, proline, phenylalanine, aspartic acid, glutamic acid, tyrosine, serine, glutamine, arginine, systeine, methionine, histidine and nitrilotriaceticacid.

26. A method according to claim 25 wherein M is a cation selected from the group consisting of $Ni^{2+}$, $Cu^{2+}$, $Fe^{3+}$, $Pd^{2+}$, $Hg^{2+}$, $Pb^{2+}$, $Zn^{2+}$, $Co^{2+}$, $Cu^+$, and $Fe^{2+}$ and mixtures thereof.

27. A method according to claim 26 wherein the amino acid is glycine and wherein M is a cation selected from the group consisting of $Ni^{2+}$, $Cu^{2+}$, $Fe^{3+}$, $Pd^{2+}$, $Hg^{2+}$ and mixtures thereof.

28. A method according to claim 27 wherein L is an amino acid.

29. A method according to claim 28 wherein the L is L-tyrosine and M is $Hg^{2+}$.

* * * * *